Feb. 23, 1954  R. FISHWICK  2,670,215
CHUCK
Filed Jan. 24, 1951

INVENTOR.
ROBERT FISHWICK.
BY
Wisner & Sloman
ATTORNEY.

Patented Feb. 23, 1954

2,670,215

UNITED STATES PATENT OFFICE 2,670,215

CHUCK

Robert Fishwick, London, England, assignor to O. V. A. Jigs Moulds & Tools Limited, Hove, Sussex, England, a British company Original application January 24, 1951, Serial No. 207,472. Divided and this application January 24, 1951, Serial No. 207,473

3 Claims. (Cl. 279—38)

This invention relates to bevel-closing chucks of the type in which the chuck jaws are forced into contact with a tool by means of a screwed cap having an internal wedge surface which can be forced against corresponding wedge surfaces on the outside of the chuck jaws, the invention being preferably embodied in a chuck in which the gripping action of the jaws upon the tool is initially effected by the operation of one component of the chuck and is completed by the operation of an auxiliary locking component of the chuck. This application is a division of copending application Serial No. 207,472, filed January 24, 1951.

The object of the invention is to provide an improved form of such type of chuck, easy to manufacture and simple and convenient in operation.

The invention consists in a bevel-closing chuck of the type indicated wherein the chuck jaws are adapted to slide radially with respect to a plunger member slidably mounted for longitudinal movement in the body of the chuck, resilient means being provided to engage said jaws and to urge them into engagement with each other, the gripping face of each jaw being formed so as to provide a fulcrum intermediate the length thereof and about which the jaw can pivot when in engagement with a surface, so that when the said jaws are in engagement with each other or with a tool or the like inserted therebetween, the jaws will be caused to rock about said fulcrum under the action of said resilient means into the open or splayed apart position.

One embodiment of the invention is shown in the accompanying diagrammatic drawings in which.

In carrying the invention into effect in the form illustrated by way of example, the principal components of the chuck are a body, tapered shaft, cap, ball, piston, spring and jaws. The body $a$ is a cylindrical body, one end of which is screw-threaded externally to receive the cap $b$, which is threaded internally. The cap is formed with an internal conical surface with which tapered arcuate surfaces on the exterior of the jaws $c$ engage. The jaws are guided in radial slots $d$ in a plunger member $e$ having a tapered hole $m$ and a portion of reduced diameter slidably mounted in an axial bore in the body $a$. Sliding movement of the plunger $e$ is effected by means of a ball $f$ and the tapered shaft $g$ in a manner to be hereinafter described. The jaws are normally maintained in the position shown in Figure 2 by a rubber band or resilient ring of wire $h$ which passes through apertures in the inner ends of the jaws. In an alternative construction, the jaws may be grooved or recessed to receive the wire ring $h$.

The body is drilled transversely for the reception of the tapered shaft $g$, the taper being concentric with the axis of the shaft. The shaft is formed at one end with a parallel portion which is rotatably mounted in a hole in the wall of the body and acts as a support for the shaft. The other end of the shaft is screwthreaded at $j$ to engage a corresponding screwthread in the body, so that rotation of the shaft $g$ will cause the tapered portion to move across the axis of the body. Between the tapered portion of the shaft $g$ and the plunger member $e$ is mounted the ball $f$ so that rotation of the shaft $g$ will cause the plunger $e$ to move longitudinally with respect to the body $a$ due to the engagement of the tapered portion of the shaft with the ball. A tool such as the drill $i$ is gripped between the jaws in the first instance by rotation of the screwed cap $b$. The gripping action of the jaws is then increased by rotation of the tapered shaft $g$ in a direction to urge the jaws forwardly by means of the ball and the plunger the ball $f$ being seated in a recess $k$ in the plunger. The external shape of the cap may be any suitable desired form, but I prefer it to be somewhat of the nature of a round nosed bullet.

Figure 1:
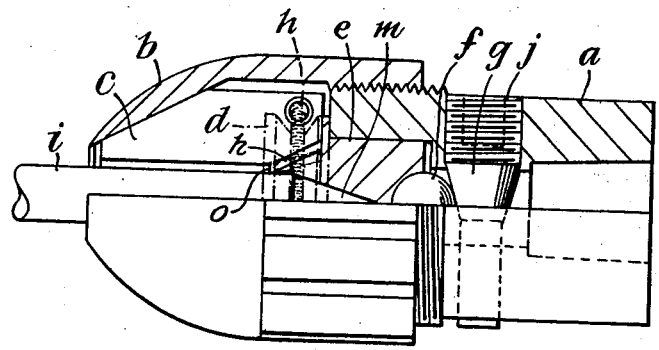
Figure 1 is a side elevation, partly in section, of a convenient construction of chuck incorporating the present invention with a tool shown secured in position.
Figure 2:
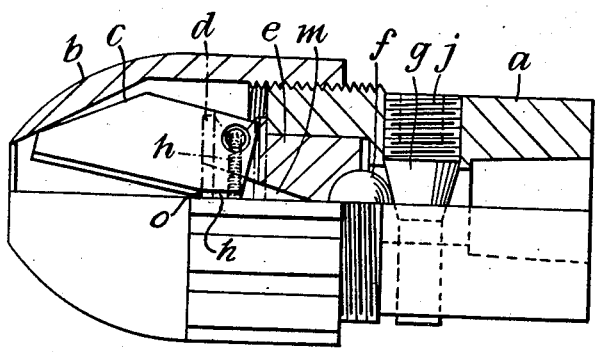
Figure 2 is a similar view with the tool removed.
Figure 3:
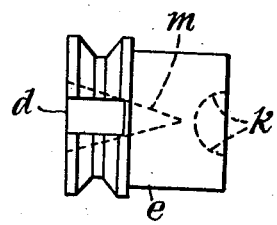
Figures 3 and 4 are side and end elevational views respectively of a chuck jaw plunger.
Figure 4:
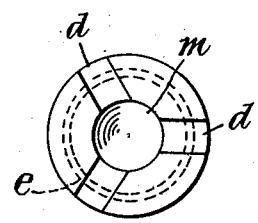

As shown in Figs. 1 and 2, the jaws $c$ have cutaway or tapered portions $n$ in their inner gripping surfaces which extend rearwardly from a point $o$ intermediate the length thereof to provide a fulcrum at $o$ about which each jaw can pivot.

What I claim is:

1. In a bevel closing chuck, a body with a longitudinal bore, a plunger member having radial slots in its front face slidable within said bore, chuck jaws slidably supported in angularly spaced apart relation at their rear ends in said radial slots, said jaws having cut-away portions in their gripping surfaces extending rearwardly from a point intermediate the length thereof to provide a fulcrum about which each jaw can pivot, and spring means engaging said jaws rearwardly of said fulcrums to urge the rear ends of said jaws inwardly of said radial slots whereby the forward ends of said jaws will be angularly out-turned to facilitate insertion of a tool therebetween.

2. In a bevel closing chuck, a body with a longitudinal bore, a plunger member having radial slots in its front face slidable within said bore, chuck jaws slidably supported in angularly spaced apart relation at their rear ends in said radial slots, said jaws having cut-away portions in their gripping surfaces extending rearwardly from a point intermediate the length thereof to provide a fulcrum about which each jaw can pivot, and a resilient ring encircling said jaws and in engagement therewith rearwardly of said fulcrums whereby the rear portions of said jaws are urged inwardly of said radial slots to pivot about their respective fulcrums so that said jaws are in splayed apart position at their front portions to facilitate insertion of a tool therebetween.

3. In a bevel closing chuck, a body with a longitudinal bore, a plunger member having radial slots in its front face slidable within said bore, chuck jaws slidably supported in angularly spaced apart relation at their rear ends in said radial slots, said jaws having cut-away portions in their gripping surfaces extending rearwardly from a point intermediate the length thereof to provide a fulcrum about which each jaw can pivot, a resilient ring encircling said jaws and in engagement therewith rearwardly of said fulcrums whereby the rear portions of said jaws are urged inwardly of said radial slots to pivot about their respective fulcrums so that said jaws are in splayed apart position at their front portions to facilitate insertion of a tool therebetween, and a transverse spindle having an axially tapered portion extending across said body to the rear of said plunger member and transversely movably into said body, the tapered portion of said spindle engaging the rear end of said plunger member for effecting longitudinal movement of the plunger member with respect to the body to urge the said jaws into gripping engagement with a tool positioned within the chuck.

ROBERT FISHWICK.

References Cited in the file of this patent

UNITED STATES PATENTS

| Number | Name | Date |
|---|---|---|
| 1,953,637 | Smith et al. | Apr. 3, 1934 |
| 2,040,678 | Van Buskirk | May 12, 1936 |
| 2,067,442 | Frisz | Jan. 12, 1937 |

FOREIGN PATENTS

| Number | Country | Date |
|---|---|---|
| 21,567 | France | Nov. 15, 1920 |
| 496,296 | France | Nov. 15, 1920 |